United States Patent [19]

Janik et al.

[11] Patent Number: 5,766,463

[45] Date of Patent: *Jun. 16, 1998

[54] FUEL FILTER CARTRIDGE

[75] Inventors: Leon P. Janik, Suffield; M. Craig Maxwell, Colchester, both of Conn.

[73] Assignee: Stanadyne Automotive Corp., Windsor, Conn.

[*] Notice: The term of this patent shall not extend beyond the expiration date of Pat. No. 5,186,829.

[21] Appl. No.: 683,182

[22] Filed: Jul. 18, 1996

Related U.S. Application Data

[63] Continuation of Ser. No. 301,044, Sep. 6, 1994, abandoned, which is a continuation of Ser. No. 14,664, Feb. 8, 1993, abandoned, which is a continuation of Ser. No. 745,870, Aug. 16, 1991, Pat. No. 5,186,829.

[51] Int. Cl.$^6$ .................................................. B01D 27/08
[52] U.S. Cl. .................... 210/232; 210/316; 210/438; 210/440; 210/444; 210/450
[58] Field of Search .............................. 210/232, 314, 210/316, 317, 335, 438, 439, 440, 443, 444, 446, 454, 484, DIG. 17

[56] References Cited

U.S. PATENT DOCUMENTS

| | | | |
|---|---|---|---|
| 1,443,682 | 1/1923 | Gueritey | 220/296 |
| 2,014,800 | 9/1935 | Deguenther | 210/317 |
| 2,287,982 | 6/1942 | Frudden | 210/438 |
| 3,256,989 | 6/1966 | Hultgren | 210/438 |
| 3,844,443 | 10/1974 | Cudzik | 220/296 |
| 4,719,012 | 1/1988 | Groezinger et al. | 210/232 |
| 4,950,400 | 8/1990 | Girondi | 210/335 |
| 5,017,285 | 5/1991 | Janik | 210/232 |
| 5,035,797 | 7/1991 | Janik | 210/232 |
| 5,186,829 | 2/1993 | Janik | 210/232 |
| 5,236,579 | 8/1993 | Janik et al. | 210/438 |

FOREIGN PATENT DOCUMENTS

| | | | |
|---|---|---|---|
| 1943946 | 3/1970 | Germany | 210/444 |

*Primary Examiner*—Matthew O. Savage
*Attorney, Agent, or Firm*—Alix, Yale & Ristas, LLP

[57] ABSTRACT

A fuel filter cartridge is formed from a pair of shell sections which are joined along a roll seam to form a retaining shoulder. The sections have generally cylindrical walls which are symmetric about a central axis. One of the sections has a diameter greater than the other section. Angularly spaced arcuate protrusions or keys protrude radially from the cylindrical wall of the cartridge.

22 Claims, 5 Drawing Sheets

FUEL FILTER CARTRIDGE

This application is a continuation of U.S. patent application Ser. No. 08/301,044 filed on Sep. 6, 1994, now abandoned, which was a continuation of U.S. patent application Ser. No. 08/014,664 filed on Feb. 8, 1993, now abandoned, which was a continuation of U.S. patent application Ser. No. 07/745,870 filed on Aug. 16, 1991, now U.S. Pat. No. 5,186,829.

BACKGROUND OF THE INVENTION

This invention relates generally to fuel filters employed in connection with internal combustion engines. More particularly, the present invention relates to fuel filters having a replaceable cartridge for removing foreign particles and/or separating water from the fuel supply system of an internal combustion engine.

Conventionally, fuel filters employ a disposable filter cartridge which is replaced at pre-established intervals of filter usage. In practice, the filter cartridge requirements may vary depending upon such characteristics as the type and make of the internal combustion engine, the specific application for which the engine is employed, the climate in which the combustion engine is operated, and/or regional characteristics as to the quality of the fuel supply. The filter cartridges which are suitable for replacement, thus commonly vary as to axial dimensions, capacity and filter media qualities.

One of the recurring problems in assuring quality fuel filter performance is encountered in connection with replacement of the fuel cartridge. It is imperative that the replacement cartridge be compatible with the filtering requirements for the fuel system. Because for numerous types of qualities, the filter cartridge may dimensionally conform to the base of a given fuel filter assembly, replacement filter cartridges of inferior quality may not comply with the applicable specifications for a given fuel filter assembly and thereby jeopardize the integrity of the fuel filtering system. The replacement with an incompatible filter cartridge can have very serious consequences for the operation of the internal combustion engine and may also be unnecessarily more expensive than the less costly cartridges which are fully suitable. In practice, the owner of the vehicle and/or the maintenance technician servicing the internal combustion engine are frequently totally unaware of replacement filter cartridge specifications and requirements and unknowingly jeopardize the integrity of the filtering system by replacement with a wholly unsuitable cartridge even though the unsuitable cartridge at least cursorally visibly appears to be suitable. There are also, of course, instances where inferior or improper replacement filter cartridges are intentionally installed without the knowledge of the owner or the operator of the vehicle.

For many applications, it is also desirable that a cartridge be mounted to the base at a specific angular orientation so that warnings, directions and markings affixed to the cartridge may be properly positioned to ensure visibility and maximize the chances of successful information dissimination.

In U.S. Pat. No. 5,035,797, assigned to the assignee of the present invention, a key system for keying a replaceable filter cartridge to the base is disclosed. The filter system is of a type having a base with an inlet and an outlet connection with the engine fuel system and a replaceable filter cartridge mountable to the base. The replaceable cartridge includes a generally cylindrical housing which houses the fuel filter elements. At least one key projects axially from the base. A corresponding slot in the cartridge is dimensioned and located for receiving each corresponding key for locking the cartridge at a fixed angular position of the base. The keys interlock in slots of the cartridge at locations which are closely adjacent to the sealing interface of the cartridge and the sealing lip of the base.

A unique matrix of axially projecting keys is formed on each base of a given type, and a unique matrix of slots corresponding to the keys is formed in each cartridge. The key slot matrices are configured so that for a given compatible cartridge and base, the keys are interlockable in the slots to lock the cartridge at a fixed angular position of the base to thereby permit the cartridge to be securely mounted to and sealed to the base. For non-compatible cartridges and bases, the base keys are not mateable and essentially interfere with the mounting and sealing of the non-compatible cartridge so that compatible and non-compatible cartridges may be readily identified.

While the key system described in the foregoing patent application represents a significant advancement in assuring suitable fuel filter cartridge replacement, there are replacement cartridge configurations, which are closely similar in appearance to the compatible cartridges and may result in confusion and assembly difficulties. Because the key slots are not readily visible and may be similar in appearance to slots which provide for fuel communication between the cartridge and the base, it is clearly desirable that the cartridge incorporate additional keying structure which is highly visible to the maintenance technician and may also provide additional coded structural combinations to enhance the integrity and reliability of the key system.

SUMMARY OF THE INVENTION

Briefly stated, the invention in a preferred form is a new and improved key system for assuring compatibility between a replacement filter cartridge and a base for a fuel filter system. The key system may be employed in conjunction with a key system which employs a matrix of axially protruding keys. The keys extending from the base and corresponding complementary slots of the cartridge are dimensioned and positioned for accepting the keys and selectively mounting a suitable cartridge to the base. The filter base preferably is of a type which has an inverted cup-like portion defining a receptacle for receiving the replaceable cartridge. The receptacle is partially defined by axial recesses in the side walls which form tracks. The recesses are defined by equidistantly spaced rails. Several such recesses may be angularly spaced at the receptacle interior.

The filter cartridge, which may have a can-like housing comprised of a pair of sections joined along a roll seam, includes a plurality of arcuate protrusions projecting from the cylindrical side surface. The arcuate protrusions are complementary with the spacing of the rails and are angularly positioned so that when the cartridge is mounted to the base, the protrusions axially slide along the tracks and are closely received in the corresponding recesses. The projections and the tracks may be dimensioned and positioned to provide a keyed configuration which selectively identifies replacement cartridge compatibility and aids the technician in selecting and installing a suitable replacement cartridge.

The protrusions and the corresponding tracks are angularly positioned so as to generally alternate with the key and slot combinations of the base and the cartridge so that essentially a dual key code system is provided.

The fuel filter cartridge comprises a housing for housing at least one filter element. The housing comprises opposing first and second shell sections which have generally cylindrical walls axially symmetric about a central axis. The diameter of the first section is greater than the diameter of the second section. The second section has an axial opening. The sections are joined along a circumferential seam which defines a shoulder extending radially from the first section wall. A generally annular recess is radially inwardly located adjacent the seam. The angularly spaced protrusions integrally project from the second section. The protrusions have a generally arcuate sectional portion in a plane orthogonal to the central axis. The arcuate dimensions of two of the protrusions are different. Each of the shell sections may house a filter element.

An object of the invention is to provide a new and improved fuel filter cartridge for a fuel filter system.

Another object of the invention is to provide a new and improved replacement cartridge key system wherein the cartridge has a highly visible key structure which corresponds with a given base.

A further object of the invention is to provide a new and improved fuel filter key system having an efficient construction which provides an effective means for selectively identifying compatible and non-compatible replacement filter cartridges.

Other objects and advantages of the invention will become apparent from the drawings and the specification.

DETAILED DESCRIPTION OF THE PREFERRED EMBODIMENT

Figure 1:
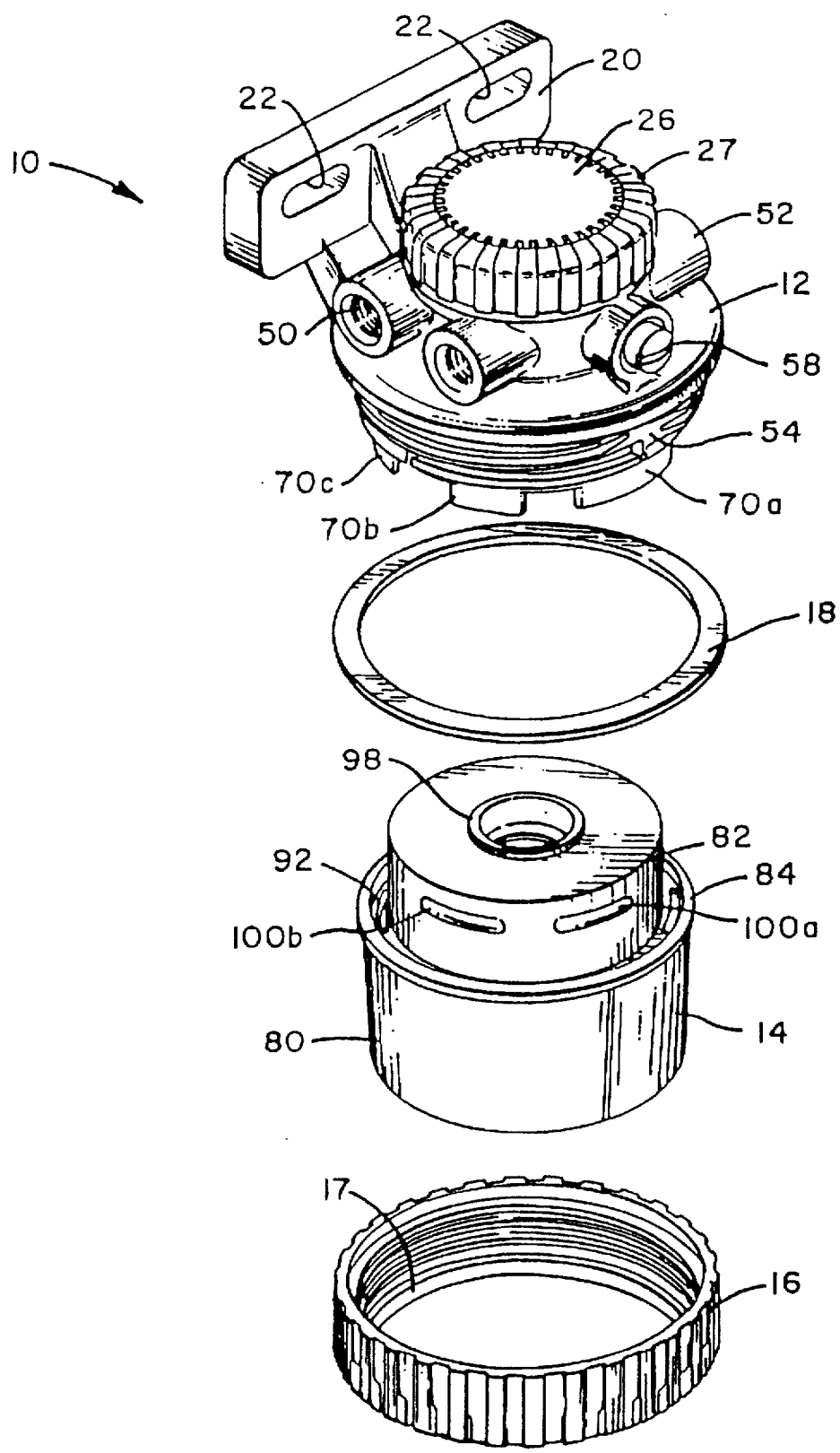
FIG. 1 is an exploded perspective view of a fuel filter assembly incorporating a key system in accordance with the present invention.
Figure 2:
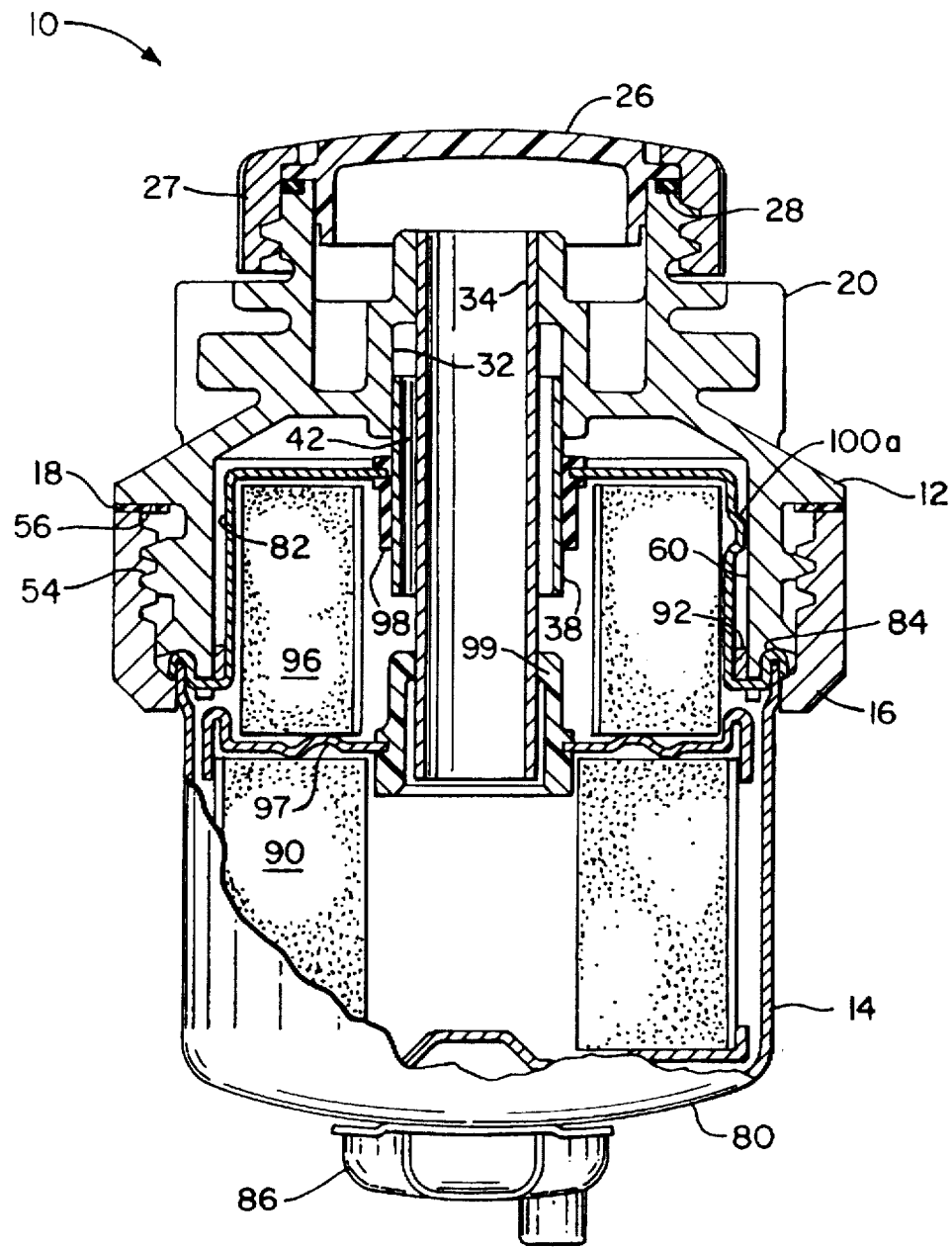
FIG. 2 is a frontal sectional view, partly broken away, of the assembled fuel filter system of FIG. 1.
Figure 3:
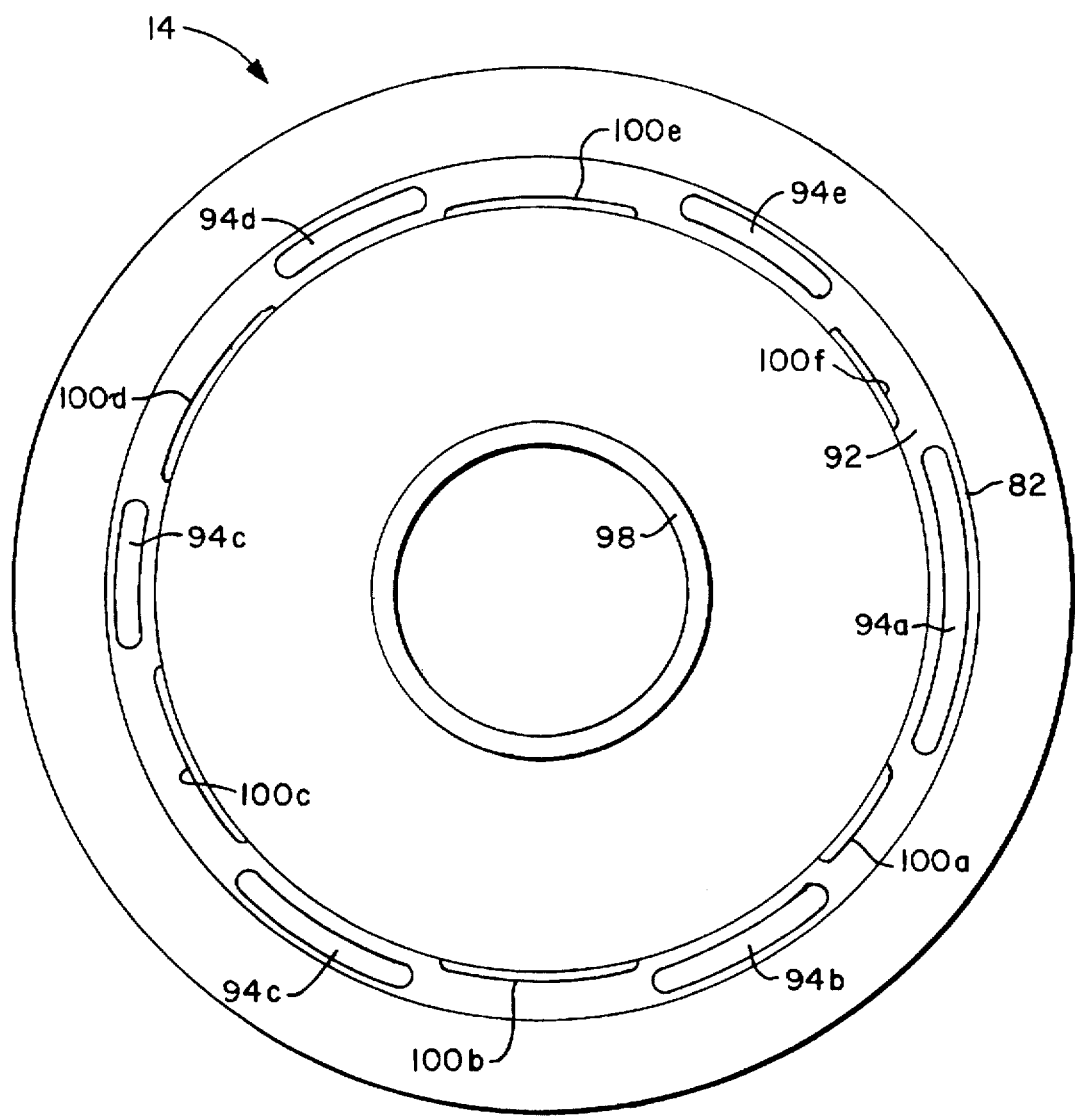
FIG. 3 is a top plan view of the cartridge for the fuel filter assembly of FIG. 1.

With reference to the drawings wherein like numerals represent like parts throughout the several figures, a fuel filter assembly incorporating a key system in accordance with the present invention is generally designated by the numeral 10. Fuel filter assembly 10 comprises a base 12 and a disposable filter cartridge 14 which is secured to the base by means of a retaining ring or collar 16. A dust seal 18 may be interposed between one end of the collar and the base. The filter cartridge 14 houses the filter material which has a defined useful life. The cartridge is periodically replaced with a compatible replacement cartridge. The fuel filter assembly 10 is especially suitable for incorporation into the fuel supply system of an internal combustion engine (not illustrated), such as a diesel engine, to filter particulate material and remove water from the fuel supply to the engine.

Although the key system may be employed with a wide variety of fuel filter configurations, the illustrated fuel filter assembly 10 may be similar in form and function to those described in U.S. Pat. No. 5,017,285 and U.S. Pat. No. 5,035,797, both of which applications are assigned to the assignee of the present invention. The key system of the present invention is not limited to any specific fuel filter assembly, but is generally applicable to any fuel assembly employing a base which mounts and seals with a replaceable filter cartridge of a generally cylindrical form. The key system of the present invention may be employed either apart from or in conjunction with a key system, such as disclosed in U.S. Pat. No. 5,035,797, principal features of which are generally illustrated in the drawings.

The illustrated filter assembly is an inverted-type filter assembly wherein the cartridge 14 is suspended generally below the base 12. The cartridge 14 contains a dual stage or other type filtering system which functions to remove particulate matter from the fuel and to separate water from the fuel. The fuel filter assembly 10 may also include a heater unit for heating the fuel during cold conditions to prevent the precipitation of wax crystals from the fuel.

The base 12 is preferably a cast member, which includes an integral cast formed mounting bracket 20. The bracket 20 contains one or more slots 22 to facilitate mounting the base to the header or other appropriate structure of an internal combustion engine. The base 12 may further include a coarse filter screen. A head cap 26 is mounted to the base by a threaded ring 27 to secure the screen in position. A sealing ring 28 may also be employed to provide a fluid-tight seal between the cap and the base. The base 12 is an inverted quasi cup-like member which has a central stepped axial bore 32. A conduit or sleeve 34 is received at one end of the upper reduced portion of the base. The lower segment of the stepped bore has an enlarged diameter which receives a second sleeve or conduit 38. The conduits 34 and 38 are disposed in generally concentric relationship and provide for generally axial fluid communication between the cartridge and the base.

The base includes a fuel inlet passage 50 and a fuel outlet passage 52. An annular passage 42 which is disposed between the conduits 34 and 38 communicates with the outlet passage. The inlet passage communicates with the passage formed by the conduit 34.

A threaded surface 54 at the lower peripheral portion of the base is configured for threaded engagement with the retaining collar 16 for securing the disposable filter cartridge to the base. A lower circumferential lip 56 of the base receives the dust seal 18 which is engaged by the top of the retainer collar 16. An air vent 58 may also be threaded on the side of the base for venting trapped air therein. The lower portion of the base has a generally cylindrical inner surface 60 which defines an upper receiving cavity for an upper portion of the replaceable filter cartridge.

A plurality of axially extending keys 70a, 70b, 70c . . . project from the base at a location which is adjacent the threaded surface 54. The keys preferably have a generally arcuate cross-section and are selectively dimensioned and positioned to provide a unique key matrix for a given filter capacity, filtering quality or filtering parameter as will be detailed below.

The disposable filter cartridge 14 comprises a can-like housing formed by a pair of cooperative cup-like shell sections 80 and 82 which are joined along a circumferential roll seam 84. The roll seam 84 preferably forms a retainer shoulder which is engaged by a flange-like rim 17 of the retaining collar for loading the replaceable cartridge to the base. The larger can section 80 includes an axial opening which receives a drain cock 86. The drain cock 86 is employed for manually draining water from the cartridge.

A filter element 90 having a continuous fan-shaped pleated form is housed within the enlarged can section 80. The upper can-like section has a radially outward, compound bend configuration which forms an annular recess. An insert 92 is pressed into the recess and secured in position. The insert defines slots 94a, 94b, 94c . . . which are complementary with the keys and are dimensioned and positioned for receiving the keys. The reduced can section 82 houses the secondary filter element 96 and has an axial opening which mounts a sealing grommet 98. The sealing grommet diametrally seals the enlarged conduit 38. A medial plate 97 may also be disposed between the can sections and engage the upper and lower portions of the primary and the secondary filter elements 90 and 96. The medial plate 97 defines an opening which receives and mounts a second sealing grommet 99. The grommet 99 fluidly seals against the conduit 34.

For some embodiments only a single stage filter element (not illustrated), which axially extends into both shell sections 80 and 82, is employed. The medial plate 97 is omitted. The second sealing grommet may be mounted to an axial tube having multiple openings (not illustrated) which is mounted at the inside portions of the filter element.

The outer exterior portions of the reduced can section are configured with a matrix of integral, angularly spaced radial protrusions 100a, 100b, 100c . . . . . The protrusions are preferably die-formed and have an outer cylindrical surface portion so as to define an arcuate section transverse to the central axis of the cartridge. The protrusions preferably axially align around the periphery of the cartridge. The radial protrusions preferably angularly alternate with the angular positions of the slots 94a, 94b, 94c . . . of the insert 92. The number of protrusions and the arcuate dimensions and the angular positions of the protrusions 100a, 100b, 100c, . . . are selected to implement a key code to ensure cartridge compatibility with the base. The protrusion matrix illustrated in the drawings merely illustrates one possible configuration which may, for example, correspond to a given filter capacity, dimensional constraint, or filter media or cartridge orientation or various combinations thereof.

The base structure which defines the cartridge receiving cavity further includes a plurality of angularly spaced recesses 110a, 110b, 110c . . . . The recesses have a generally arcuate cross-section and are defined by opposing equidistantly spaced endwalls or rails 112a, 112b, 112c . . . and 114a, 114b, 114c . . . . The endwalls and the recesses form tracks which are dimensioned to closely axially receive the protrusions 100a, 100b, 100c . . . to angularly key the cartridge to the base. When the cartridge is axially mounted to the base, the protrusions are angularly aligned with the associated tracks and the cartridge is axially pushed onto the base. The recesses or tracks angularly alternate with the axially protruding keys so that a compatible filter cartridge is mountable to the base and mechanically selected in terms of compatibility by proper positioning and alignment of the respective key/slot and/or protrusion/track configurations. The protrusions provide a readily visible key system for the maintenance technician to further facilitate proper selection of the filter cartridge.

Various combinations or arrays of corresponding protrusions and tracks may be employed so as to selectively identify compatible and non-compatible filter cartridges for given cartridge filtering capacity, quality and other parameters. The key system embodying a protrusion/track configuration may be employed in conjunction with the key/slot combinations or may be employed apart from the key/slot combinations to provide a key system for defining compatible and non-compatible replacement cartridges.

Figure 4:
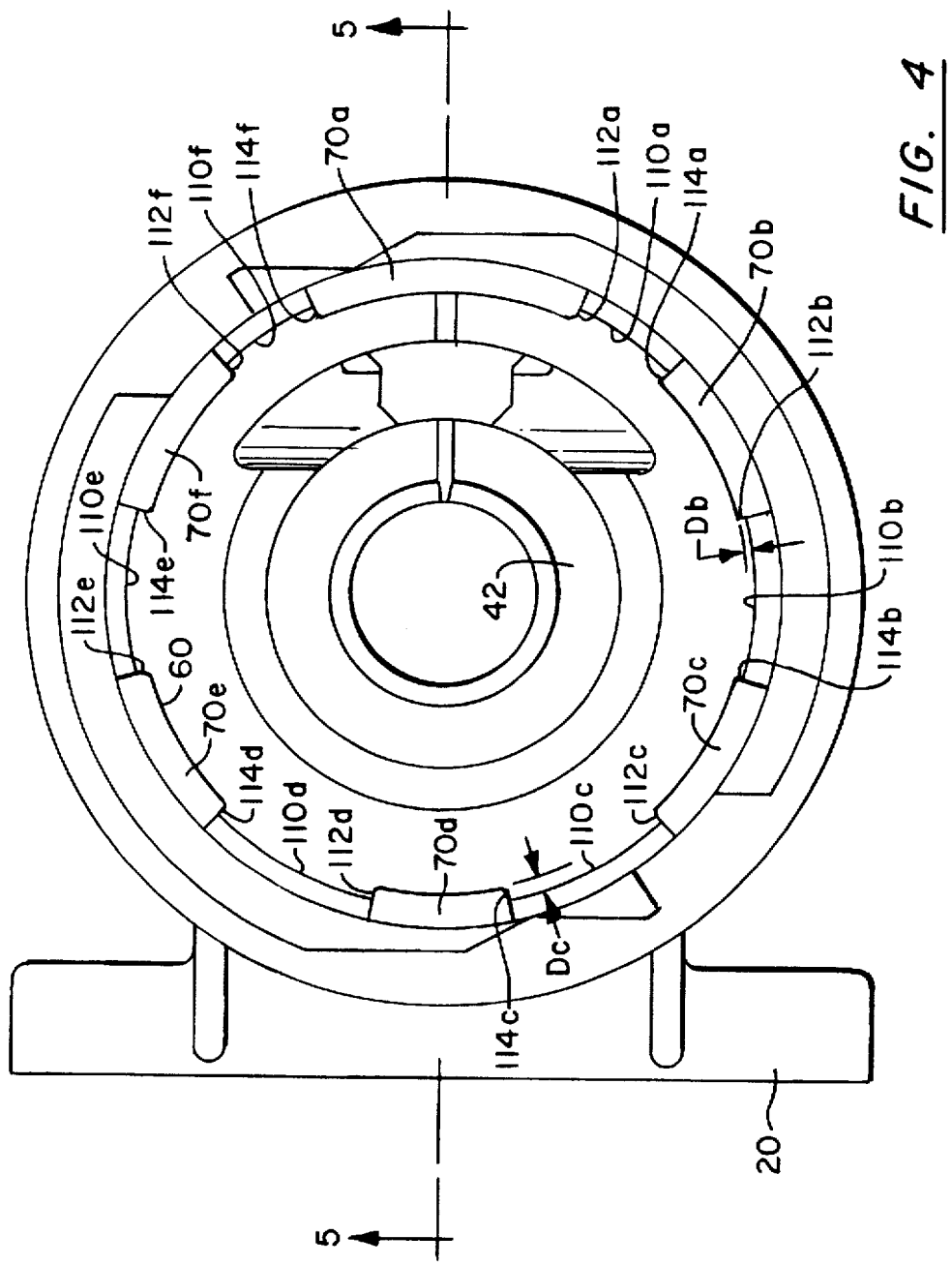
FIG. 4 is a bottom view of the base for the fuel filter assembly of FIG. 1.
Figure 5:
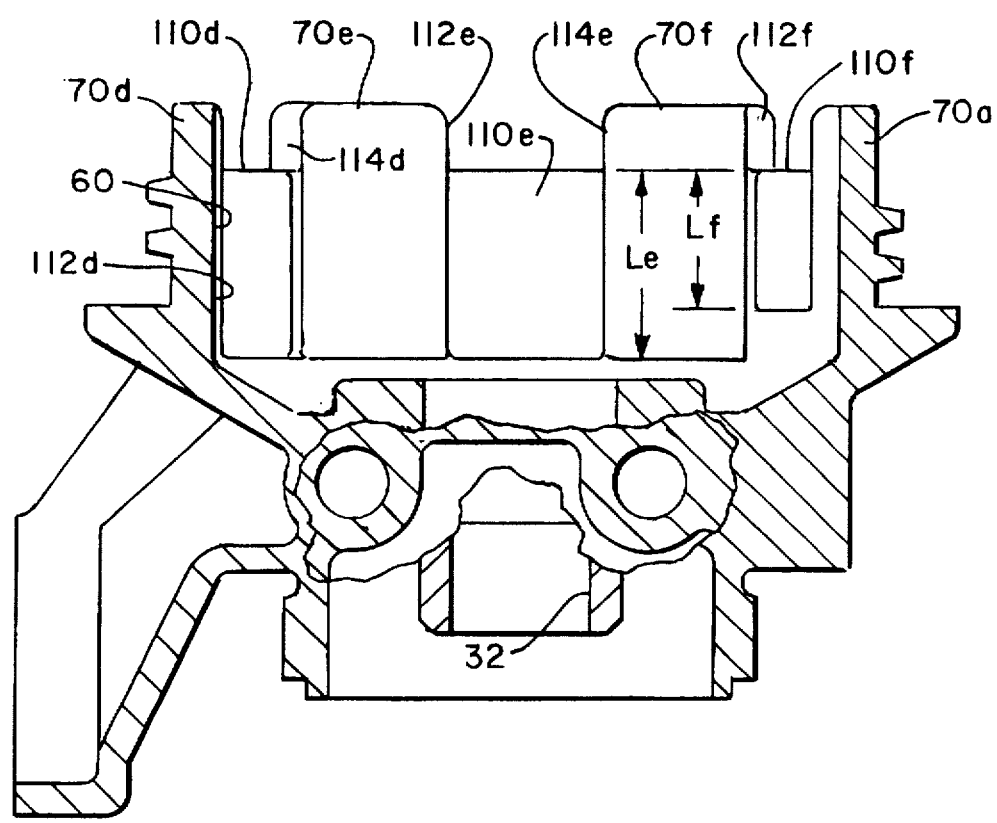
FIG. 5 is a sectional view, partly broken away and portions removed, of the base of FIG. 4 taken along the line 5—5 thereof.

The tracks and protrusions may be uniformly dimensioned or may be non-uniformly dimensioned for a given base/cartridge assembly. The radial depths of the recessed tracks and the corresponding protruding dimensions of the corresponding protrusions may also be varied to provide additional key combinations. For example, as illustrated in FIG. 4, depth Db for track 10b is less than depth Dc for track 110c. The radial extent of the corresponding protrusion 100b would be proportionately less than the radial extent of protrusion 100c. Likewise, the axial dimensions or lengths of the tracks and the axial positions of the protrusions may also be varied to provide additional key combinations. For example, as illustrated in FIG. 5, the axial length Lf of track 110f is less than the axial length Le of track 110e. The axial positions of the lower terminus of protrusion 110f would be above that of the lower terminus of protrusion 110b.

In some embodiments of the filter cartridge, the insert 92 is not employed. The shell section 82 may also have a generally cylindrical wall without any protrusions 100a, 100b, 100c . . . in some embodiments.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter cartridge for mounting to a base to form a filter assembly comprising:

filter means comprising first and second filter elements;

housing means for housing said filter means comprising opposing first and second shell sections wherein said first shell section has a first sidewall having a first maximum outer diameter and said second shell section has a second sidewall having a second maximum outer diameter, said first maximum outer diameter being greater than said second maximum outer diameter, said first sidewall having one end closed by a first end wall and an opposite open end, said second sidewall having one end closed by a second end wall and an opposite open end, said sections being generally symmetric about a central axis, said second end wall defining an axial opening, a connection for joining together the open ends of said first and second sidewalls, wherein said first and second end walls define axially extreme end walls of said cartridge, wherein said filter means is entirely enclosed within said housing means and wherein said first filter element is disposed in said first shell section and said second filter element is disposed in said second shell section, and wherein said second filter element includes an axial channel extending therethrough positioned adjacent the axial opening in said second end wall, whereby the axial opening in said second end wall and said axial channel of said second filter element are configured and arranged to receive a stand pipe extending from said base; and shoulder means connected to said housing means comprising a substantially circumferentially extending shoulder for axial engagement to secure said cartridge to a base, said shoulder means extending generally radially relative to said central axis.

2. The filter cartridge of claim 1 wherein said shell sections are joined along a roll seam, said roll seam defining said shoulder means.

3. The filter cartridge of claim 2 wherein said second section further comprises recess means for defining a generally annular recess radially inwardly adjacent said seam.

4. The filter cartridge of claim 3 further comprising slot means for defining at least one slot in said recess.

5. The filter cartridge of claim 1 further comprising a plurality of angularly spaced protrusions integrally projecting generally radially from said second section, said protrusions having circumferentially spaced end walls.

6. The filter cartridge of claim 5 wherein said protrusions generally axially align around the periphery of said second section.

7. The filter cartridge of claim 5 wherein said protrusions have a generally arcuate shaped section portion in a plane orthogonal to said axis.

8. The filter cartridge of claim 1 further comprising seal means mounted to said second section for diametrally sealing against a conduit received in said opening.

9. A filter cartridge for mounting to a base to form a filter assembly comprising:
- filter means comprising first and second filter elements, said second filter element being discontinuous from said first filter element; and
- housing means for housing said filter means comprising first and second sections wherein said first section has a first sidewall having a first maximum outer diameter and said second section has a second sidewall having a second maximum outer diameter, said first and second sidewalls being generally cylindrical and axially symmetric about a central axis, said first maximum outer diameter being greater than said second maximum outer diameter, said first sidewall having one end closed by a first end wall and an opposite open end, said second sidewall having one end closed by a second end wall and an opposite open end, said second end wall defining an axial opening, said second sidewall excluding any openings;
- a connection for fixedly connecting together the open ends of said first and second sidewalls, said connection including a circumferential seam which defines a shoulder extending radially from said first said wall, said first and second end walls defining axially extreme end walls of said filter cartridge, wherein said second filter element is disposed in said second section and said first filter element is disposed in said first section, and wherein said second filter element includes an axial channel extending therethrough positioned adjacent the axial opening in said second end wall, whereby the axial opening in said second end wall and said axial channel of said second filter element are configured and arranged to receive a stand pipe extending from said base.

10. The filter cartridge of claim 9 wherein said second section comprises recess means for defining a generally annular recess radially inwardly adjacent said seam.

11. The filter cartridge of claim 10 wherein said seam is a roll seam.

12. The filter cartridge of claim 9 further comprising a plurality of angularly spaced protrusions integrally projecting from said second section, said protrusions having circumferentially spaced end walls.

13. The filter cartridge of claim 12 wherein said protrusions have a generally arcuate shaped portion in a plane orthogonal to said central axis.

14. A fuel filter cartridge for mounting to a base to form a fuel filter assembly comprising:
- filter means comprising at least one filter element for filtering fuel; and
- housing means for housing said filter means comprising first and second sections having generally cylindrical walls axially symmetric about a central axis, said first and second sections having first and second maximum outer diameters, said first maximum outer diameter being greater than said second maximum outer diameter, said second section defining an axial opening and, having at least one protrusion integrally projecting generally radially from said wall of said second section and axially spaced apart from said wall of said first section, said protrusion defining an arcuate section having circumferentially spaced end walls wherein said protrusion defines a plane orthogonal to said axis; and
- shoulder means connected to said housing means comprising a substantially circumferentially extending shoulder extending radially outwardly from said wall of said first section, said shoulder means being positioned axially intermediate said first and second maximum outer diameters.

15. The fuel filter cartridge of claim 14 wherein said sections are joined along a roll seam, said roll seam defining said shoulder means, and said second section comprises recess means for defining a generally annular recess adjacent said roll seam.

16. The fuel filter cartridge of claim 14 comprising two angularly spaced protrusions which generally axially align around the periphery of said second section.

17. The fuel filter cartridge of claim 14 wherein said filter means comprises a first element housed in said first section and a second element housed in said second section.

18. A filter cartridge for mounting to a base to form a fuel filter assembly comprising:
- filter means; and
- housing means for housing said filter means comprising first and second shell sections having first and second maximum outer diameters, said first maximum outer diameter greater than said second maximum outer diameter, said sections being generally symmetric about a central axis, said second section defining an axial opening, a plurality of angularly spaced projections integrally projecting generally radially from said second section and axially spaced apart from said first section, wherein said protrusions define a plane orthogonal to said axis; and
- shoulder means connected to said housing means comprising a substantially circumferentially extending shoulder for axial engagement to secure said cartridge to a base, said shoulder means extending generally radially outwardly relative to said central axis from said wall of said first section, said shoulder means being positioned axially intermediate said first and second maximum outer diameters.

19. A filter cartridge for mounting to a base to form a fuel filter assembly comprising:
- filter means; and
- housing means for housing said filter means comprising first and second sections having generally cylindrical walls axially symmetric about a central axis, said first and second sections having first and second maximum outer diameters, said first maximum outer diameter being greater than said second maximum outer diameter, said second section defining an axial opening, said sections joined along a circumferential seam which defines a shoulder extending radially from said wall of said first section, said shoulder being positioned axially intermediate said first and second maximum outer diameters, a plurality of angularly spaced protrusions projecting radially outwardly from said second section and axially spaced apart from said wall of said first section, wherein said protrusions define a plane orthogonal to said axis.

20. A filter cartridge for mounting to a base to form a filter assembly comprising:

filter means;

housing means for housing said filter means comprising opposing first and second shell sections having first and second diameters, said first section having a diameter greater than said second diameter, said sections being generally symmetric about a central axis, said second section defining an axial opening and comprising a plurality of angularly spaced protrusions integrally projecting generally radially therefrom, said protrusions having a generally arcuate shaped section portion in a plane orthogonal to said axis wherein the arcuate dimensions of two of said protrusions are different, said sections being joined together and defining axially extreme end walls of said cartridge; and shoulder means connected to said housing means comprising a substantially circumferentially extending shoulder for axial engagement to secure said cartridge to a base, said shoulder means extending generally radially relative to said central axis.

21. A filter cartridge for mounting to a base to form a filter assembly comprising:

filter means; and housing means for housing said filter means comprising first and second sections having generally cylindrical walls axially symmetric about a central axis, said first and second sections having first and second diameters, said first section having a diameter greater than said second diameter, said second section defining an axial opening and comprising a plurality of angularly spaced protrusions integrally projecting therefrom, said protrusions having a generally arcuate shaped section portion in a plane orthogonal to said central axis wherein the arcuate dimensions of two of said protrusions are different, said sections joined along a circumferential seam which defines a shoulder extending radially from said first section wall.

22. A filter cartridge for mounting to a base to form a filter assembly comprising:

filter means;

housing means for housing said filter means comprising first and second sections having generally cylindrical walls axially symmetric about a central axis, said first and second sections having first and second diameters, said first section having a diameter greater than said second diameter, said second section defining an axial opening, said sections joined along a circumferential seam which defines a shoulder extending radially from said first section wall, said second section comprising recess means for defining a generally annular recess inwardly adjacent said seam; and insert means mounted in said recess for defining at least one slot in said recess.

* * * * *